United States Patent
Hoogerbrugge et al.

(10) Patent No.: US 11,782,744 B2
(45) Date of Patent: Oct. 10, 2023

(54) DATA PROCESSING SYSTEM AND METHOD FOR ACCESSING DATA IN THE DATA PROCESSING SYSTEM

(71) Applicant: NXP B.V., Eindhoven (NL)

(72) Inventors: Jan Hoogerbrugge, Helmond (NL); Wilhelmus Petrus Adrianus Johannus Michiels, Reusel (NL)

(73) Assignee: NXP B.V., Eindhoven (NL)

( * ) Notice: Subject to any disclaimer, the term of this patent is extended or adjusted under 35 U.S.C. 154(b) by 399 days.

(21) Appl. No.: 17/066,179

(22) Filed: Oct. 8, 2020

(65) Prior Publication Data

US 2022/0114002 A1 Apr. 14, 2022

(51) Int. Cl.
*G06F 9/455* (2018.01)
*G06F 21/79* (2013.01)
*H04L 9/06* (2006.01)

(52) U.S. Cl.
CPC .......... *G06F 9/45558* (2013.01); *G06F 21/79* (2013.01); *H04L 9/0643* (2013.01); *G06F 2009/45583* (2013.01); *G06F 2221/2149* (2013.01)

(58) Field of Classification Search
CPC ...... G06F 9/45558; G06F 21/79; G06F 21/53; G06F 2009/45583; G06F 2221/2149; H04L 9/0643
See application file for complete search history.

(56) References Cited

U.S. PATENT DOCUMENTS

| 8,627,061 B1 * | 1/2014 | Best .................. H04L 63/0428 713/153 |
| 8,832,465 B2 | 9/2014 | Gulati et al. |
| 10,565,370 B2 | 2/2020 | Trivedi et al. |

(Continued)

FOREIGN PATENT DOCUMENTS

JP 2022541796 A * 7/2020

OTHER PUBLICATIONS

Costan, Victor et al.; "Sanctum: Minimal Hardware Extensions for Strong Software Isolation;" 25th USENIX Security Symposium; Aug. 10-12, 2016, Austin, Texas.

(Continued)

*Primary Examiner* — Lynn D Feild
*Assistant Examiner* — Abdullah Almamun
(74) *Attorney, Agent, or Firm* — Daniel D. Hill

(57) ABSTRACT

A data processing system has a processor, a system memory, and a hypervisor. The system memory stores program code and data in a plurality of memory pages. The hypervisor controls SLAT (second level address translation) read, write, and execute access rights of the plurality of memory pages. A portion of the plurality of memory pages are classified as being in a secure enclave portion of the system memory and a portion is classified as being in an unsecure memory area. The portion of the memory pages classified in the secure enclave is encrypted and a hash is generated for each of the memory pages. During an access of a memory page, the hypervisor determines if the accessed memory page is in the secure enclave or in the unsecure memory area based on the hash. In another embodiment, a method for accessing a memory page in the secure enclave is provided.

20 Claims, 8 Drawing Sheets

(56) References Cited

U.S. PATENT DOCUMENTS

| | | | | |
|---|---|---|---|---|
| 2012/0324236 | A1* | 12/2012 | Srivastava | H04L 9/3234 |
| | | | | 713/189 |
| 2015/0347768 | A1* | 12/2015 | Martin | G06F 21/56 |
| | | | | 726/1 |
| 2016/0171248 | A1* | 6/2016 | Nesher | G06F 21/53 |
| | | | | 713/190 |
| 2018/0285140 | A1* | 10/2018 | Kaplan | G06F 9/45558 |
| 2018/0341529 | A1* | 11/2018 | Kou | G06F 21/53 |
| 2019/0042764 | A1* | 2/2019 | Durham | G06F 21/602 |
| 2019/0095351 | A1* | 3/2019 | Chhabra | H04L 9/3242 |
| 2020/0218792 | A1* | 7/2020 | Kataria | G06F 21/53 |
| 2020/0356686 | A1* | 11/2020 | Vijayvargiya | G06F 21/568 |
| 2021/0182208 | A1* | 6/2021 | Palmer | G06F 12/1491 |
| 2021/0184864 | A1* | 6/2021 | Wentz | H04L 9/3073 |

OTHER PUBLICATIONS

Di Pietro, Roberto et al.; "Virtualization Technologies and Cloud Security: advantages, issues, and perspectives;" arXiv.org > cs > arXiv:1807.11016; Submitted Jul. 29, 2018; Last Revised Aug. 2, 2018.

Haider, Syed Kamran et al.; "Intel's Sgx In-depth Architecture," Apr. 8, 2016; UCONN University of Connecticut; Course ECE 6095: Secure Computation & Storage, Lecture—SGX Archtecture; https://scl.engr.uconn.edu/courses/ece6095/lectures/sgx_architecture.pdf / Course: https://scl.engr.uconn.edu/courses/ece6095/scs.php.

Horsch, Julian et al.; "TransCrypt: Transparent Main Memory Encryption Using a Minimal Arm Hypervisor," 2017 IEEE Trustcom/BigDataSE/ICESS; Aug. 1-4, 2017; Sydney, NSW, Australia; DOI: 10.1109/Trustcom/BigDataSE/ICESS.2017.232.

Wikipedia "Software Guard Extensions," Page last edited Sep. 25, 2020; Downloaded from the Internet Oct. 1, 2020: https://en.wikipedia.org/wiki/Software_Guard_Extensions.

Xing, Bin (Cedric) et al; "Intel® Software Guard Extensions (Intel® SGX) Software Support for Dynamic Memory Allocation inside an Enclave," HASP 2016: Proceedings of the Hardware and Architectural Support for Security and Privacy 2016; Jun. 2016; Article No. 11; https://doi.org/10.1145/2948618.2954330.

US Appl. No. 16/893,628; Inventor Jan Hoogerbrugge; "Program Code Protection in a Data Processing System;" filed Jun. 5, 2020.

* cited by examiner

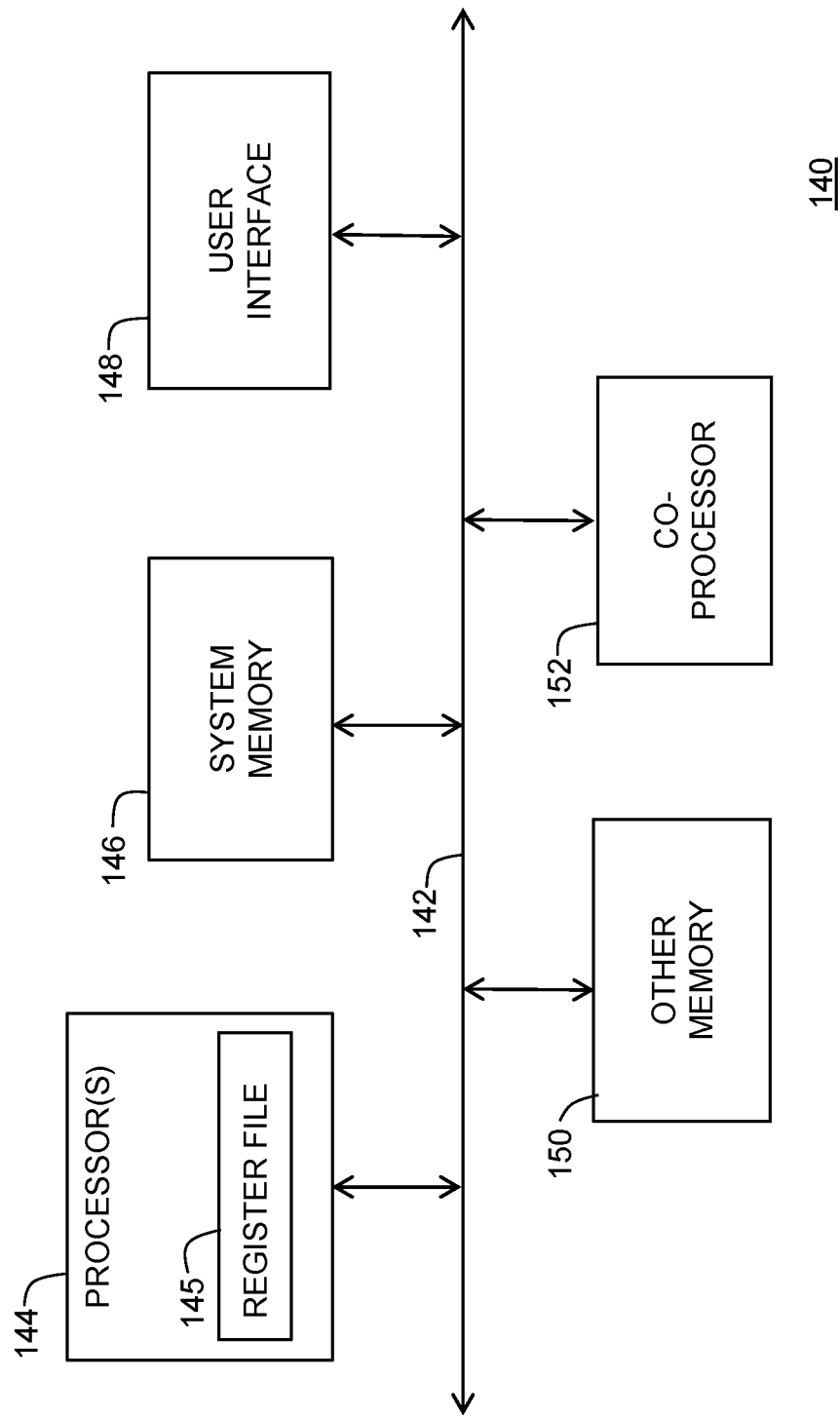

DATA PROCESSING SYSTEM AND METHOD FOR ACCESSING DATA IN THE DATA PROCESSING SYSTEM

BACKGROUND

Field

This disclosure relates generally to data processing, and more particularly, to accessing data in a data processing system.

Related Art

A typical software system includes an operating system (OS) that manages the hardware of the system, and user applications that run on top of the OS. Technology called virtualization allows multiple operating systems to operate in parallel in a single hardware data processing system. Software that manages the multiple operating systems is called a hypervisor. The operating systems are sometimes referred to as guest operating systems, and each guest OS has its own user applications. The hypervisor virtualizes the hardware system so that the guest operating systems are not aware of other guest operating systems on the data processing system. There are various motivations to use a hypervisor. For example, the hypervisor allows resource sharing while providing safety and security to the system.

To allow virtualization of the hardware data processing system, two levels of address translation are used. First level address translation (FLAT) is controlled by the guest operating systems, and second level address translation (SLAT) is controlled by the hypervisor. Also, the FLAT and SLAT perform read, write, and execute permission checks for memory accesses to provide a level of security to the data processing system.

A secure enclave can provide hardware-level isolation and memory protection for program code and data similar to protection provided by a trusted execution environment (TEE) or secure element (SE). A secure enclave may be part of normal user space code and provides protection for program code and data residing in the secure enclave. However, a secure enclave may still be vulnerable to certain kinds of attacks.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 8 illustrates a data processing system in accordance with an embodiment.

DETAILED DESCRIPTION

Figure 1:
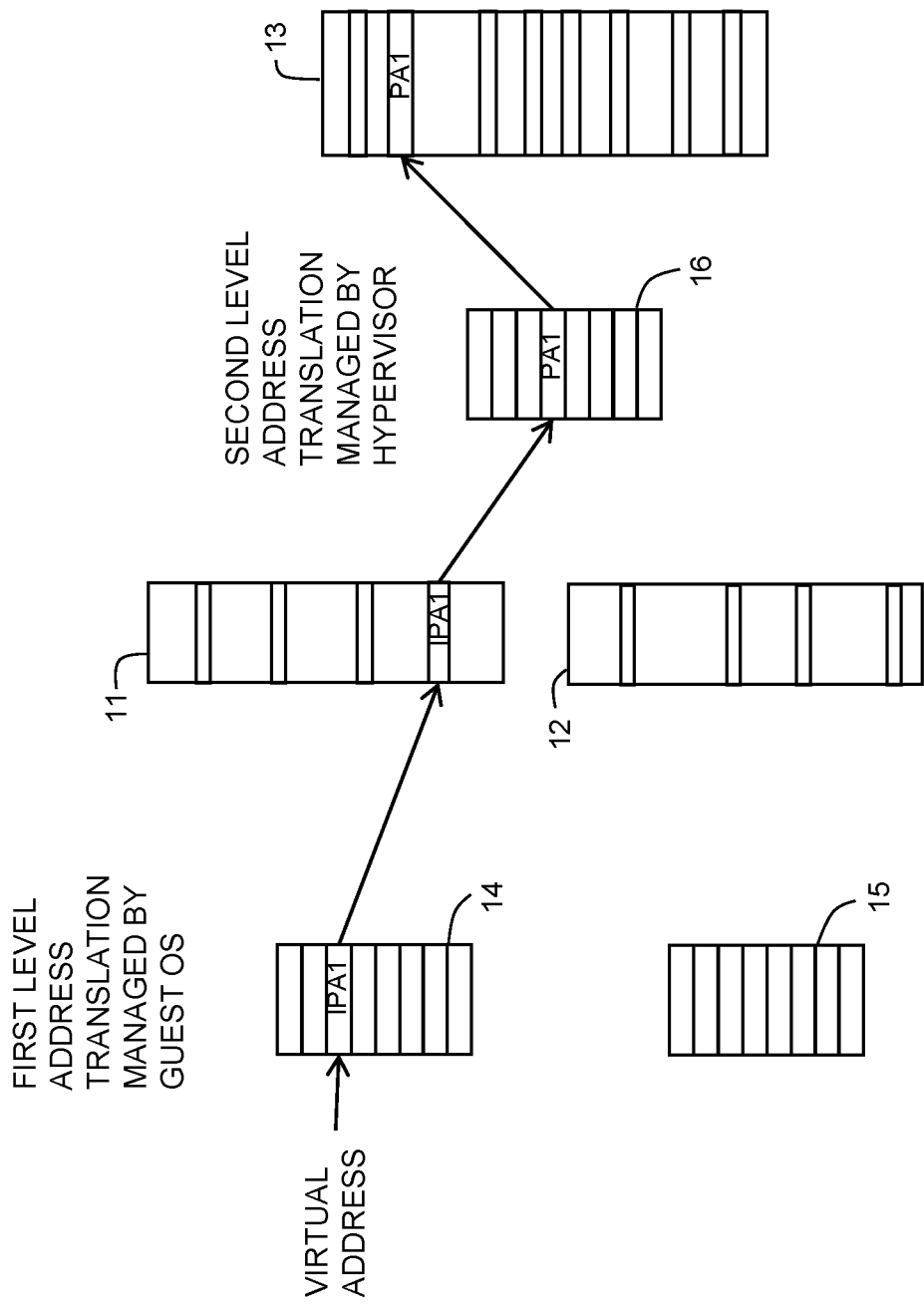
FIG. 1 illustrates two levels of address translation in a data processing system.

Generally, there is provided, a data processing system and method for accessing memory pages in a system memory of the data processing system. The data processing system includes multi-level address translation controlled by a hypervisor. The hypervisor also controls read, write, and execute access of one or more guest operating systems (OS) to the system memory. The system memory may be organized as a plurality of memory pages. In the method, it is determined which memory pages of the system memory are to be protected by being stored in a secure enclave. The determination may be made by, for example, a program developer. The memory pages stored in the secure enclave are encrypted. Also, the locations of the memory pages in the secure enclave are maintained in a file system. Hashes are generated for all memory pages in the secure enclave and the hashes are made available to the hypervisor while also being protected from a guest OS. Preferably, the hashes are stored outside the guest OS, in a location not accessible by the guest OS, so that any malicious code operating in the guest OS does not have access to the location and cannot change the hashes. The hypervisor uses the hashes to determine if a memory page being accessed in the system memory is in the secure enclave or in an unsecure memory area of the system memory. Also, the key(s) used for encryption are stored in a secure location and are made available to the hypervisor.

The hypervisor will get an exception the first time a memory page is accessed. The exception is generated for all access rights, that is, read, write and execute access rights. Typically, the system hardware will generate the exceptions that are received by the hypervisor and/or guest OS. In addition, in another embodiment, if the guest OS attempts to access a memory page without the correct permission for the operation being attempted, then the hypervisor may cause the memory page to be encrypted. Encrypting the memory page prevents the guest OS from reading data that the guest OS wrote to the memory page, but still allow the guest OS to access the memory page.

By encrypting the code, if the guest OS is compromised, the attacker is prevented from copying code out of the secure enclave and thus prevents the attacker from reverse engineering the code to determine what algorithms are implemented in the code. Also, product developers may want to keep their algorithms confidential to prevent product cloning. Keeping the code confidential by encrypting using the described method prevents the attacker from raising privilege levels or prevents other similar ways of attacking the system. Also, a malicious guest OS is prevented from code reuse-based attacks such as the return-oriented programming (ROP) attack.

Additionally, in another embodiment, when a processor of the data processing system crosses the boundary between an unsecure memory area and the secure enclave, and the processor executes code inside a secure enclave, a register file of the data processing system is decrypted. When the processor crosses the boundary and the processor executes code outside the secure enclave, the register file is encrypted.

In one embodiment, there is provided, in a data processing system having a guest operating system (OS) providing first level address translation (FLAT) and a hypervisor providing second level address translation (SLAT), the hypervisor controlling read, write, and execute access rights of a plurality of memory pages in a system memory of the data processing system, a method including: providing a secure enclave in a system memory, wherein the secure enclave is more secure than an unsecure memory area of the system memory; encrypting memory pages that are to be stored in the secure enclave; storing the encrypted memory pages in a file system of the data processing system; generating hashes of the encrypted memory pages; providing the hashes to the hypervisor; and using, by the hypervisor, the hashes to determine if a memory page being accessed in the system memory is classified as being in the secure enclave or in the unsecure memory area. The method may further include: initially granting SLAT access rights to all the plurality of memory pages; and generating, by the hypervisor, an exception when an initial access to a memory page is attempted, wherein using the hashes may further include checking, by the hypervisor, the hash of the memory page being initially checked to determine if the memory page belongs in the secure enclave or in the unsecure memory area. The method may further include determining if a memory access crosses a boundary between the secure enclave and the unsecure memory area, wherein on determining that the memory access crosses the boundary, the hypervisor may remove execute, read, and write access rights to the plurality of memory pages. On an initial read or write access to a memory page of the plurality of memory pages, the method may further include determining if the read or write access is allowed, wherein if the read or write access is allowed and the accessed memory page is encrypted, the accessed memory page may be decrypted, wherein if the read or write access to the memory page is not allowed and the accessed memory page is not encrypted, the accessed memory page is encrypted, and wherein if the read or write access to the memory page is not allowed, and the accessed memory page is encrypted, the accessed memory page remains encrypted and the read or write access is granted. The method may further include decrypting a register file of the data processing system when a processor of the data processing system executes code inside the secure enclave, and encrypting the register file of the data processing system when the processor executes code outside the secure enclave. When the processor executes code inside the secure enclave, the processor may switch to an enclave program stack having a stack pointer, and when the processor exits the secure enclave, the processor may reset the stack pointer of the enclave program stack to what the stack was before the processor executed the code inside the secure enclave. The method may further include: accessing a code memory page, the code memory page storing executable code; determining that the accessed code memory page is in the unsecure memory area; determining that a boundary of the secure enclave is being crossed and the code memory page is outside the secure enclave; encrypting the code memory page; and granting access rights to the accessed code memory page. The plurality of memory pages may be in a virtual memory area of the data processing system. The method may further include: accessing a data memory page, the data memory page for storing data; determining that the data memory page being accessed is in the secure enclave; determining that the access to the data memory page is not allowed; determining that the data memory page is not encrypted; encrypting the data memory page; and granting access to the data memory page.

In another embodiment, there is provided, a method for accessing a memory page in a system memory of a data processing system, the data processing system having a guest operating system (OS) providing first level address translation (FLAT) and a hypervisor providing second level address translation (SLAT), the hypervisor controlling access rights to each of a plurality of memory pages of the system memory, wherein the plurality of memory pages includes code memory pages for storing program code to be executed by a processor of the data processing system and data memory pages for storing data that is not program code, the method including: determining which memory pages of the plurality of memory pages are to be stored in the secure enclave; encrypting the memory pages that are to be stored in the secure enclave; storing the encrypted memory pages in a file system of the data processing system; generating hashes of the encrypted memory pages; providing the hashes to the hypervisor; using, by the hypervisor, the hashes to determine if a memory page being accessed in the system memory is classified as in the secure enclave or in the unsecure memory area; accessing a code memory page; determining that the access crosses a boundary of the secure enclave; determining that the access is from outside the secure enclave; encrypting the code memory page; and granting access to the code memory page. The method may further include: accessing a data memory page; determining that the data memory page being accessed is classified as in the secure enclave; determining that the access to the data memory page is allowed; determining that the data memory page is not encrypted; encrypting the data memory page; and granting read or write access to the data memory page. The method may further include: initially granting SLAT access rights to all the plurality of memory pages; and generating, by the hypervisor, an exception when an initial access to a memory page is attempted. Determining that the access crosses a boundary of the secure enclave may further include removing execute, read, and write access rights to the plurality of memory pages. The method may further include: decrypting a register file of the data processing system when a processor of the data processing system executes code inside the secure enclave; and encrypting the register file of the data processing system when the processor executes code outside the secure enclave. When the processor executes code inside the secure enclave, the processor may switch to an enclave program stack having a stack pointer, and when the processor exits the secure enclave, the processor may reset the stack pointer of the enclave program stack to what the stack was before the processor executed the code inside the secure enclave.

In yet another embodiment, there is provided, a data processing system including: a processor for executing instructions under the control of a guest operation system (OS); a system memory coupled to the processor, the system memory configured to store a plurality of memory pages, wherein a first portion of the plurality of memory pages are stored in an unsecure memory area of the system memory and a second portion of the plurality of memory pages are stored in a secure enclave, wherein the secure enclave is more secure than the unsecure memory area, and wherein the second portion of the plurality of memory pages is stored encrypted in the secure enclave, and wherein a hash is generated of each of the second portion of the plurality of memory pages; and a hypervisor coupled to the system memory, wherein the guest OS provides first level address translation (FLAT) and the hypervisor provides second level address translation (SLAT), wherein the hypervisor controls SLAT read, write, and execute access rights of the plurality of memory pages, and wherein the hypervisor determines if an accessed memory page of the plurality of memory pages is classified as being in the secure enclave based on the hash. The data processing system may further include a register file, wherein the register file may be decrypted in response to the processor executing code in the secure enclave, and wherein the register file may be encrypted when the processor executes code outside the secure enclave. The second portion of the plurality of memory pages stored in the secure enclave may include code memory pages for storing program code to be executed by the processor and data memory pages for storing data that is not program code. The hypervisor may grant read or write access to a data memory page in the secure enclave when the read or write access is not allowed after encrypting the data memory page. The hypervisor may generate an exception in response an initial access attempt to a memory page in the secure enclave.

FIG. 1 illustrates two levels of address translation in a data processing system. In a virtualization system, multiple guest operating systems can operate in parallel in the same data processing system. A hypervisor is used to manage the resources between the multiple guest operating systems. The data processing system can be implemented such that a guest OS does not even know it is connected to a virtual machine under control of a hypervisor. A virtual memory system may be used to allocate the physical memory resources. Two levels of address translation may be used in the virtual memory system. A first level address translation (FLAT) is controlled by the guest OS and maps a virtual address (VA) to an intermediate physical address (IPA). A second level address translation (SLAT) is controlled by the hypervisor and maps the IPA to a physical address (PA).

Address translation generally happens on a memory page basis where a memory page is typically 4 Kbyte in size and pages are 4 Kbyte aligned in memory. Each VA consists of a page number and a page offset. The page number is translated via address translation and the page offset is added to the translated page number to obtain a translated memory address. In FIG. 1 guest operating systems 14 and 15 performs the FLAT to generate an IPA from a VA. The IPA is stored in memory portions 11 and 12. Then, hypervisor 16 performs the SLAT to generate a PA from the IPA to select a memory page in memory 13. As an example, a virtual address VA 1 in guest OS 14 is translated to IPA 1 and stored in a memory location in memory portion 11. The SLAT, which is managed by hypervisor 16, receives IPA 1 and translates IPA 1 to a physical address PA 1. Physical address PA 1 is then used to address a memory page in memory 13, or to select another resource in the data processing system.

Besides address translation, the FLAT and SLAT also perform read, write, and execute permission checks. For example, a load instruction needs the read permission to read the memory page. Similarly, store instructions need write access and every instruction needs execute access. When FLAT and SLAT access rights are violated, the operating system and/or hypervisor is notified via an exception. In one embodiment, the access rights associated with the memory pages are stored in FLAT and SLAT access rights tables (not shown).

Figure 2:
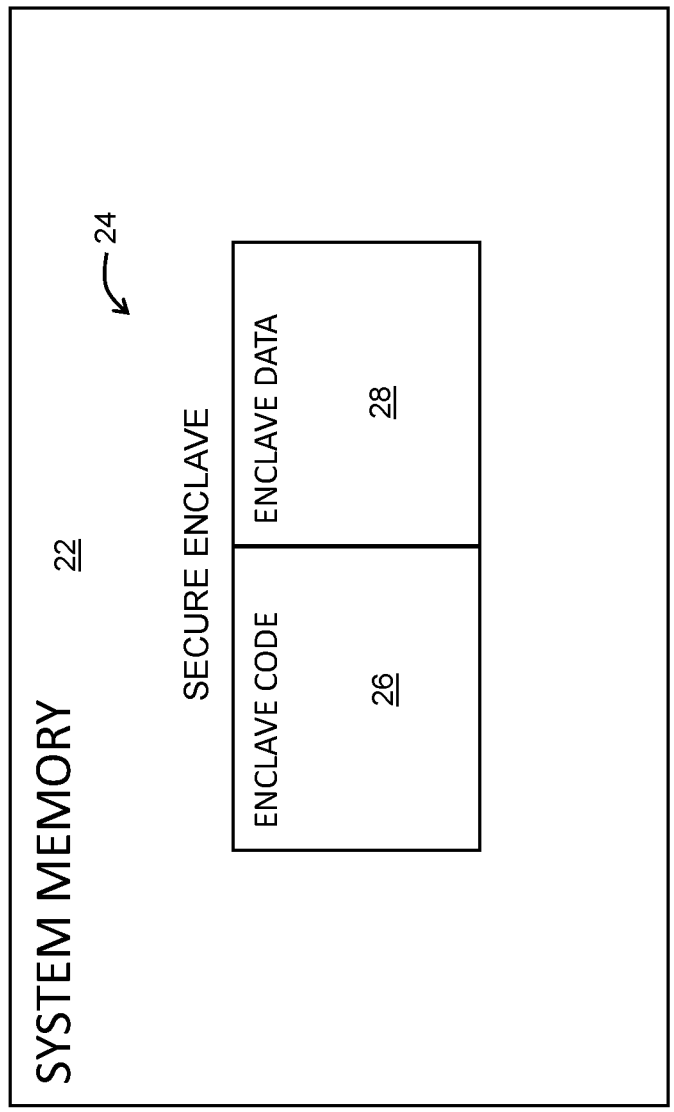
FIG. 2 illustrates a system memory having a secure enclave according to an embodiment.

FIG. 2 illustrates a system memory 20 having a secure enclave according to an embodiment. System memory 20 includes an unsecure storage area 22 and a secure storage area 24 sometimes referred to as an enclave. Secure enclave 24 securely stores program code 26 and data 28 used by user applications and an OS. Secure enclave 24 provides secure storage using encryption. For example, program code 26 and data 28 may be encrypted/decrypted according to conventional encryption/decryption software such as Advanced Encryption Standard (AES), Data Encryption Standard (DES), or other type of suitable encryption algorithm. In another embodiment, secure enclave 24 may provide additional security by another technique such as one or more of isolation, obfuscation, access restriction, or the like. In one embodiment, with respect to secure enclave 24, program code stored in unsecure storage area 22 cannot access code and data stored in secure enclave 24. All other kind of accesses are allowed. Program code in secure enclave 24 can access data and code outside secure enclave 24, making the use of secure enclave 24 relatively convenient for a programmer. That is, only small code modifications are necessary to protect code by moving sensitive code portions into secure enclave 24. Furthermore, there are no size restrictions on the amount of code and data in an enclave. Also, the system memory may include multiple enclaves, and the multiple enclaves may be isolated from each other. Each secure enclave may have its own key and set of hashes of memory pages. Note that for purposes of this description, program code is distinguished from data. In this description, program code, or code, is software that is executable by a processor, and data is not executable by a processor. Data is information that is used or acted upon during execution of the code.

Figure 3:
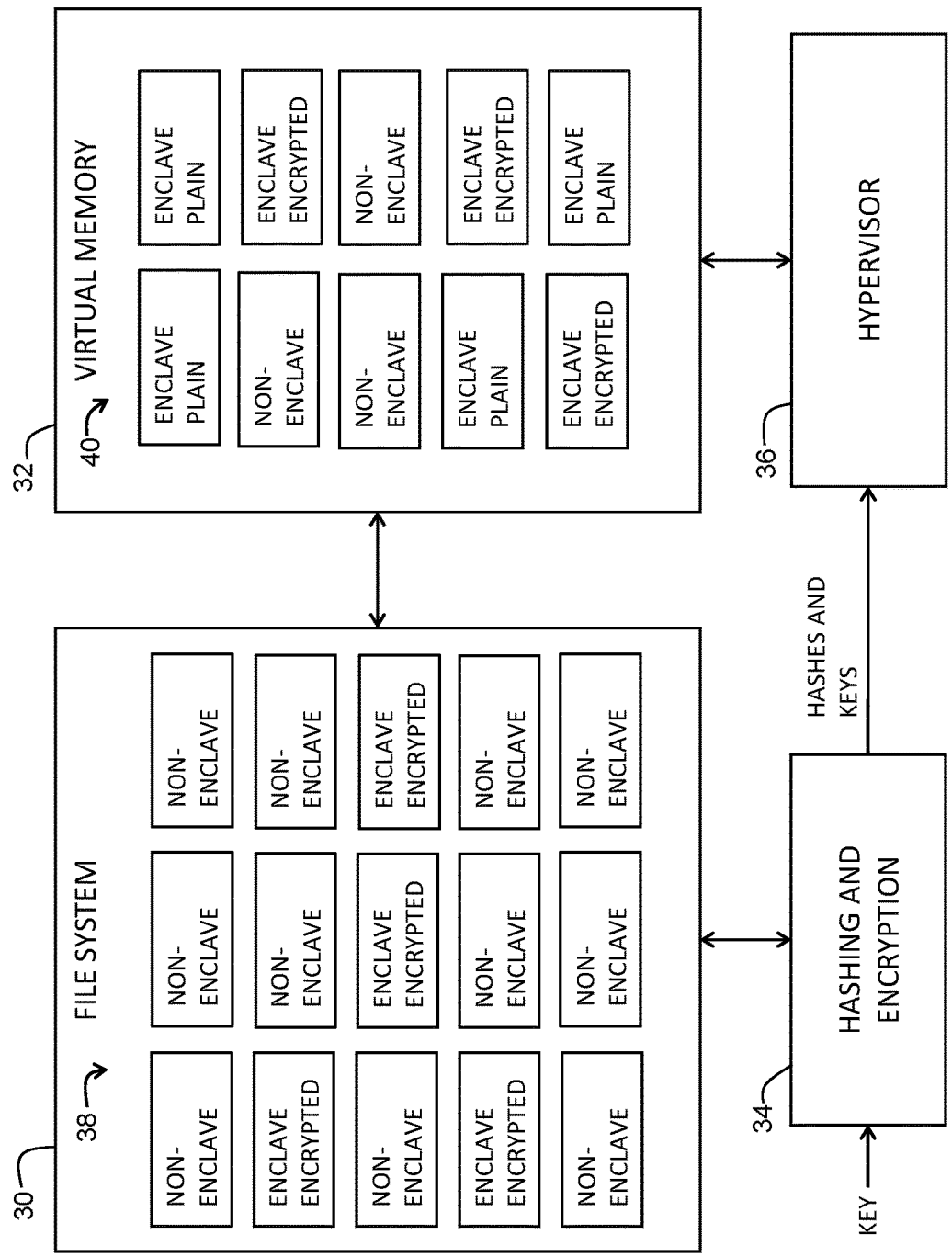
FIG. 3 illustrates hypervisor-controlled security in the system memory of FIG. 2.

FIG. 3 illustrates hypervisor-controlled security in system memory 20 of FIG. 2 in accordance with an embodiment. FIG. 3 includes file system 30, virtual memory 32, hashing and encryption block 34, and hypervisor 36. Hypervisor 36 may be implemented in software stored in a system memory and executed by a processor of the data processing system. Hypervisor 36 controls access to memory pages of the data processing system. File system 30 is bidirectionally connected to virtual memory 32. System memory 20, including virtual memory 32, can be organized in multiple ways. In the illustrated embodiment, virtual memory 32 is organized into a plurality of memory pages. File system 30 provides information regarding how data and code are stored in virtual memory 32 and may include a directory that keeps track of memory page ownership and other information related to use of the pages. For example, file system 30 shows a plurality of memory pages 38. By way of example, the plurality of memory pages 38 are labeled as non-enclave pages and enclave encrypted pages.

Typically, processors execute code from a specific physical memory sometimes referred to as RAM (random access memory). A data processing system will have a limited amount of RAM. Virtual memory 32 may be used to increase the size of the physical RAM. Virtual memory 32 may be provided on physical memory devices such as hard drives and solid-state drives (SSDs). Virtual memory 32 is organized into a plurality of memory pages 40. As an example, the plurality of memory pages 40 are divided into enclave pages and non-enclave memory pages. The enclave memory pages are further divided into "enclave plain" and "enclave encrypted," which are a part of secure enclave 24. The memory pages may also be divided into code pages and data pages (not shown in FIG. 3). The security sensitive code and data memory pages are then stored encrypted in the file system next to the other code and data that is not security sensitive and not encrypted.

Hashing and encryption block 34 is bidirectionally connected to file system 30. In one embodiment, the software developer indicates which security sensitive code and data should reside in secure enclave 24. Hashes of all the memory pages stored in secure memory 24 are computed. Hashing and encryption block 34 performs the hashing and encryption of the memory pages. The hashes of the encrypted memory pages are provided to hypervisor 36 along with the key(s) used for encryption. The hashes will be used by hypervisor 36 on the first read/write/execute access of a memory page to determine if the page being accessed belongs to secure enclave 24.

Figure 4:
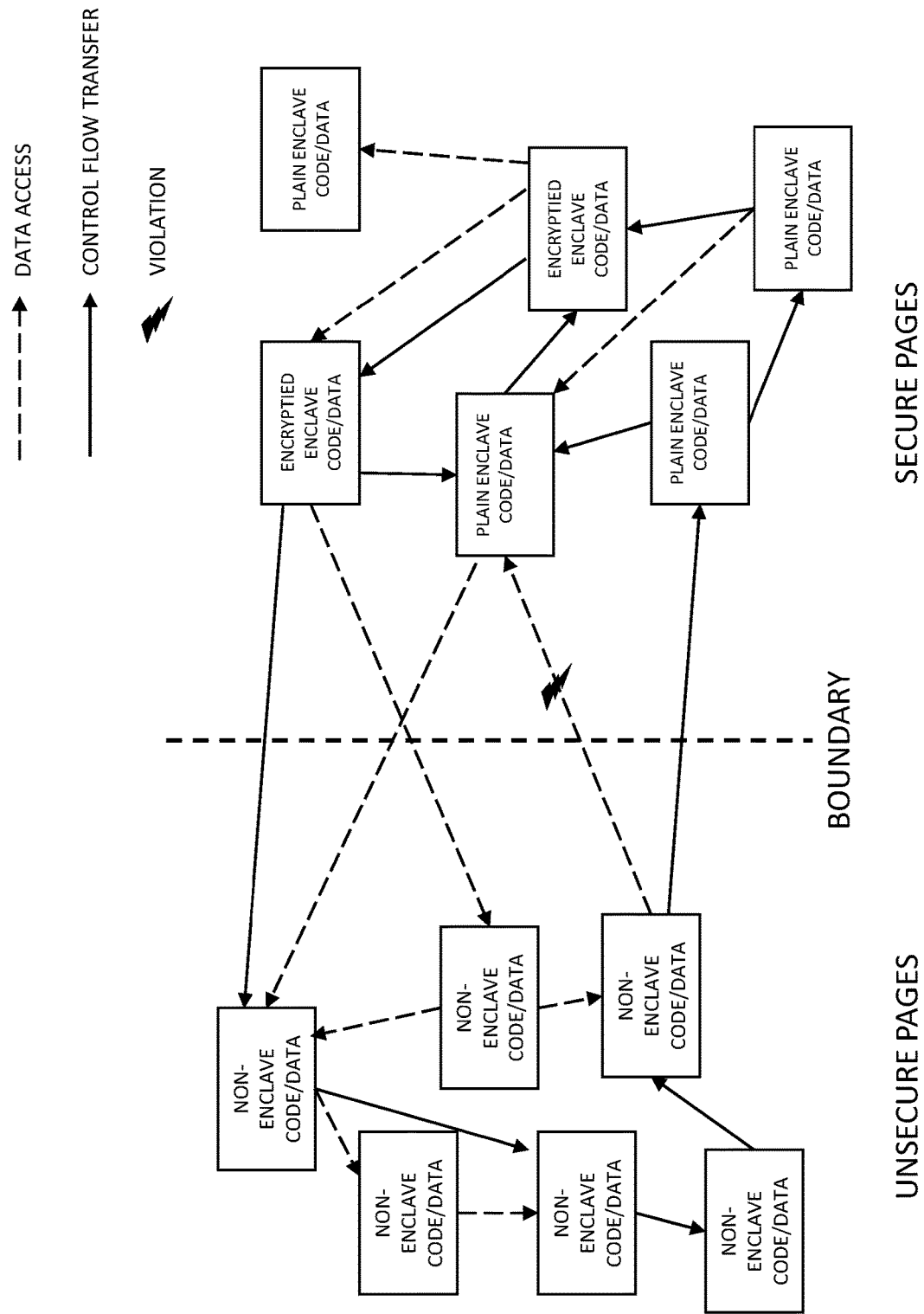
FIG. 4 illustrates access rights in the system memory of FIG. 2.

FIG. 4 illustrates access rights in the system memory of FIG. 2. In FIG. 4, non-enclave, or unsecure memory pages are shown on the left while secure enclave memory pages are shown on the right. A boundary is shown between the non-enclave pages and the secure enclave pages. Note that in an implementation, the enclave pages can be anywhere in system memory 20 and are not necessarily grouped together in one physical location. FIG. 4 is provided to show what accesses are allowed in system memory 20. Initially all memory pages will have no SLAT access rights and an initial access to a memory page will lead to an exception. In response to the initial exception, hypervisor 36 can classify the memory page using the hash of the memory page as enclave code/data or not. In one embodiment, a memory page includes only data or code, not both data and code. Then, on every execute access violation, hypervisor 36 checks whether a boundary crossing occurs as a result of the access attempt. That is, whether the access is by enclave code to non-enclave code or data, or by non-enclave code to enclave code or data. Whenever an access crosses the enclave boundary, SLAT execute access rights of all pages are removed so that hypervisor 36 can detect when a memory access crosses the enclave boundary in the other direction. When an access crosses the enclave boundary, all read and write accesses to all (known) memory pages of the enclave are denied. This makes it possible on every initial read or write access after a boundary crossing to check whether the access is allowed. If the access is allowed and the accessed page is encrypted, then the page is decrypted. Similarly, when the page was not encrypted and the access is not allowed, then when an access violation occurs the page is encrypted. An example boundary crossing data access violation is illustrated in FIG. 4 with a lightning bolt. The result is that read accesses that are not allowed (reading enclave data from outside the enclave) results in encrypted data being returned. Encrypting the enclave data prevents code outside the enclave from reading the data. Similarly, write accesses that are not allowed write plain data as encrypted in an enclave memory page, which will typically prevent an attacker from reaching his goals.

Figure 5:
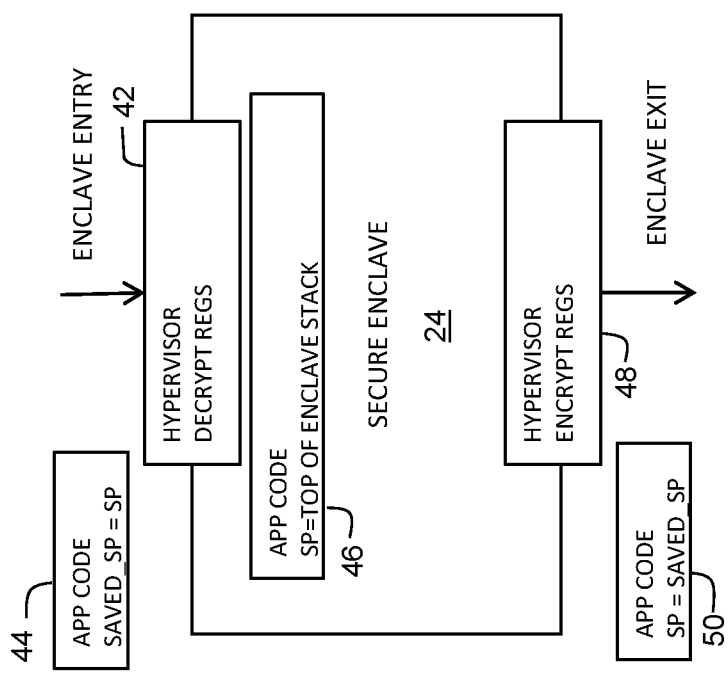
FIG. 5 illustrates register protection in accordance with an embodiment.

FIG. 5 illustrates conceptually, register protection in accordance with an embodiment. The registers are part of a hardware register file a processor uses for temporary storage. The register file stores various types of information such as addresses and data. The registers may store special information such as program counter values. There are two attack mechanisms against a secure enclave, such as secure enclave 24, that involve use of the registers. One attack is called a single-stepping attack. In the single-stepping attack, the attacker single-steps through the enclave code while the attacker tries to learn from register changes what code in the enclave is executed on what data. Another attack against an enclave is called the jump in the middle attack. Enclave code might contain the gadget:

for ( . . . )
p++=*q++;
or this gadget:
return *p.

If p and q are in the register file, an attacker might set the valves of p and q and jump to such a gadget to copy something out of the enclave. As a countermeasure against both attacks, the register file is encrypted (box 48 of FIG. 5) on exit of the enclave and the register file is decrypted (box 42) on entry to the enclave. Enclave arguments/results are passed via non-enclave memory. The secure enclave has its own stack and a stack pointer (SP). As a security measure, the stack and SP of enclave code are also stored in the enclave. The SP is set by the application code entering the secure enclave (box 44). This means that when the code enters the enclave, execution of the code has to switch to the enclave stack (box 46). When execution of the code leaves the enclave, the stack pointer is restored by the application code to the value it had when execution entered the enclave (box 50). Also, execution of code may leave the enclave and return when the guest OS is performing a context switch or handling an interrupt. In this case the registers are encrypted/decrypted as well but there will be no stack pointer switch. Calling functions outside the enclave is possible via a wrapper.

Figure 6:
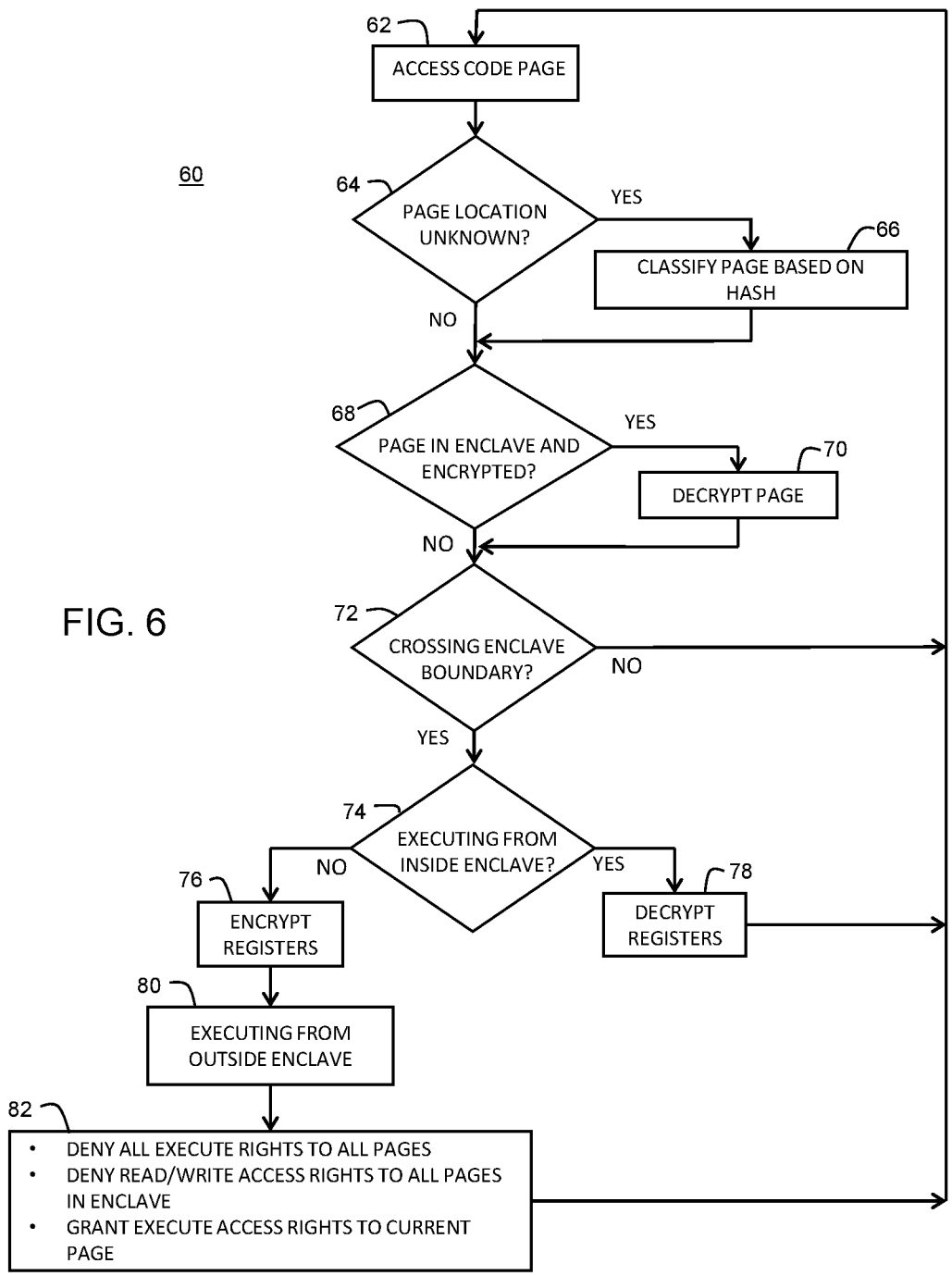
FIG. 6 illustrates a method for controlling execute access rights in the system memory of FIG. 2.

FIG. 6 illustrates method 60 for controlling execute access rights in system memory 20 of FIG. 2. Method 60 is performed in a data processing system having SLAT that is controlled by a hypervisor. The hypervisor controls read, write, and execute access permissions for memory pages in the data processing system that include executable program code and data. Hypervisor 36 keeps track of the location of each memory page using file system 30 in FIG. 3. For crossing the boundary (as illustrated in FIG. 4) a variable called 'where' may be used that indicates whether an application is executing inside or outside the enclave. In one implementation, possible location values are 'inside' the enclave, 'outside' the enclave, and 'unknown'. In the case of 'unknown' the memory page is first classified as 'inside' or 'outside' based on its hash value. For SLAT read/write accesses, two memory page types are involved: a code page corresponds to the code page where the code is executing and the data page corresponds to the data page that is being accessed for reading or writing. Method 60 begins at step 62. At step 62, a memory code page is accessed. At decision step 64, it is determined if the page location (or classification) is known or unknown. The page location may be "inside" the secure enclave 24 or "outside" the secure enclave 24. If the page location is known, the NO path is taken to decision step 68. If the page location is unknown, the YES path is taken to step 66. At step 66, the hash of the page is computed to determine the page location (i.e., classify the page as inside the enclave or outside the enclave). At decision step 68, it is asked if the page being accessed is in secure enclave 24 and encrypted. If the page is not in the enclave or encrypted, the NO path is taken to step 72. If the page is in the enclave and encrypted, the page is decrypted at step 70. At decision step 72, it is determined if an enclave boundary is crossed. If the boundary is not crossed, execution is continuing from the side of the boundary at which it started, and the NO path is taken back to step 62. If the boundary is crossed, the YES path is taken to decision step 74. At decision step 74, it is determined if the code is being executed from inside the enclave. If the code is not being accessed from inside the enclave, then the NO path is taken to step 76 where the register file is encrypted and the code is being executed from outside the enclave as provided at step 80. At step 82, all SLAT execute rights and read/write access rights are denied. Execute rights to the current page is granted. Method 60 can return to step 62 when another code page is accessed.

Figure 7:
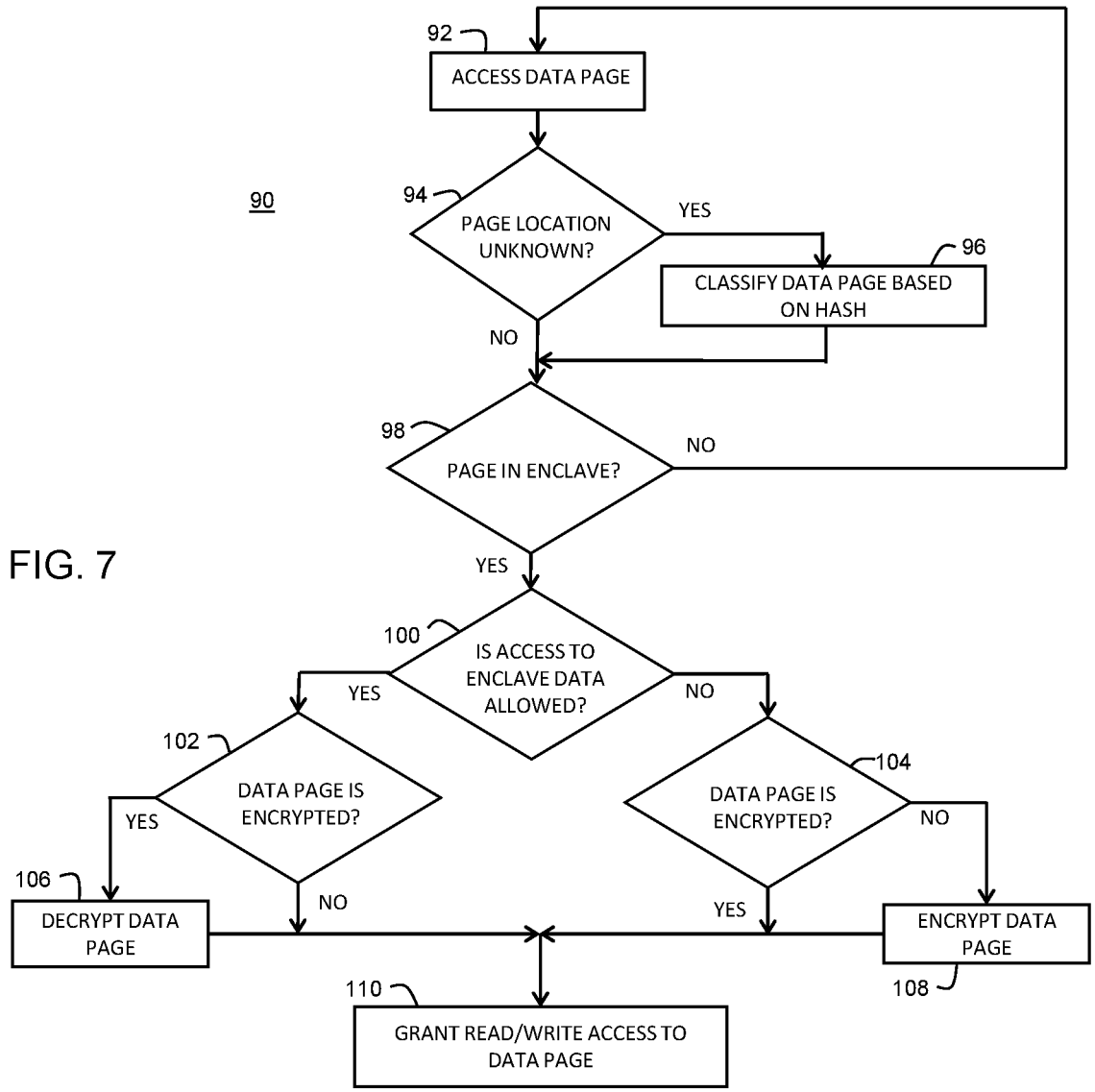
FIG. 7 illustrates a method for controlling read/write access rights in the system memory of FIG. 2.

FIG. 7 illustrates method 90 for controlling read/write access rights for a data memory page in the system memory of FIG. 2. Method 90 begins at step 92, where a data memory page access is begun. At decision step 94, it is determined if the page location is known or unknown. The page location may be classified as "inside" the secure enclave 24 or "outside" the secure enclave 24. If the page location is known, the NO path is taken to decision step 98.

If the page location is unknown, the YES path is taken to step 96. At step 96, the hash of the page is computed to determine if the page is in the secure enclave or outside the secure enclave. At decision step 98, it is asked if the page being accessed is in secure enclave 24. If not, the page is "outside" the enclave and the NO path is taken back to step 92. If the page being accessed is "inside" the enclave, the YES path is taken to decision step 100. At decision step 100, it is asked if access to enclave data allowed. Whether or not access is provided may be determined during development of the program code. If access is allowed, the YES path is taken to decision step 102 and it is asked if the page being accessed is encrypted. If the page is encrypted, the YES path is taken to step 106 and the page is decrypted. If the page is not encrypted, the NO path is taken to step 110. If at decision step 100, access to enclave data is not allowed, the NO path is taken to decision step 104, at decision step 104, it is determined if the data being accessed is encrypted. If the data is encrypted, the data is protected from unauthorized access and the YES path is taken to step 110. If the data is not encrypted, the NO path is taken to step 108 where the data is encrypted. At step 110, read/write access to the page is granted. However, the data is protected when access is not allowed because the access to provided to encrypted data. After step 110, method 90 will return to step 92 when another access is attempted.

FIG. 8 illustrates data processing system 140 suitable for implementing the above described secure enclave and methods for accessing the secure enclave. Data processing system 140 may be implemented on one or more integrated circuits and may be used in an implementation of the described embodiments. Data processing system 140 may be used in, e.g., a system having multi-level address translation in accordance with an embodiment. Data processing system 140 includes bus 142. Connected to bus 142 is one or more processor(s) 144, system memory 146, user interface 148, other memory 150, and network interface 152. The one or more processor(s) 144 may include any hardware device capable of executing instructions stored in memory 146 or other memory 150. For example, processor(s) 144 may be used in a security applications for payment or other transactions. Processor(s) 144 may be, for example, a microprocessor, field programmable gate array (FPGA), application-specific integrated circuit (ASIC), or similar device. The guest OS(s) and hypervisor may be implemented in code on processor(s) 144. Processor(s) 144 also includes a register file 145. Register file 145 may include a plurality of registers for providing temporary storage for program execution. Register file 145 may include a plurality of general-purpose registers and registers that are for a specific purpose, such as for program counters and the like.

System memory 146 may be any kind of memory, such as for example, L1, L2, or L3 cache or system memory. System memory 146 may include one of more of volatile memories such as static random-access memory (SRAM) or dynamic RAM (DRAM), or may include non-volatile memory such as flash memory, read only memory (ROM), or other volatile or non-volatile memory. Also, memory 146 may be implemented in a secure hardware element. Alternately, memory 146 may be a hard drive implemented externally to data processing system 140.

User interface 148 may be connected to one or more devices for enabling communication with a user such as an administrator. For example, user interface 148 may be enabled for coupling to a display, a mouse, a keyboard, or other input/output device. Various other hardware or configurations for communicating are available.

Co-processor 152 is bi-directionally connected to bus 142. Co-processor 152 may be a special type of one or more co-processors optimized for running encryption/decryption security software according to AES, DES, or other type of encryption algorithm. Also, hypervisor 36 may be implemented using co-processor 152. The algorithm executed on co-processor 152 may be used to encrypt/decrypt data and instructions as provided in the methods 60 and 90. Alternatively, co-processor 152 be used for another purpose, such as graphics processing.

Other memory 150 may include any other memory type in data processing system 140. For example, other memory 150 may include one or more machine-readable storage media for storing program code, or instructions, for execution by processor(s) 144. Also, other memory 150 may be one of more of a hard drive, a solid-state drive (SSD) or other memory type connected to data processing system 140. In one embodiment, other memory 150 may be used to provide virtual memory 32 in FIG. 3. In other embodiments, both memories 146 and 150 may store data upon which processor(s) 144 may operate. Memories 66 and 70 may also store, for example, encryption, decryption, and verification applications. Memories 66 and 70 may be implemented in a secure hardware element and be tamper resistant. Other memory 150 may be a part of system memory 146 or may be separate or even external to data processing system 140. Virtual memory 32 may be implemented in system memory 146 and/or other memory 150.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. In a data processing system having a guest operating system (OS) providing first level address translation (FLAT) and a hypervisor providing second level address translation (SLAT), the hypervisor controlling read, write, and execute access rights of a plurality of memory pages in a system memory of the data processing system, a method comprising:
   providing a secure enclave in a system memory, wherein the secure enclave is more secure than an unsecure memory area of the system memory;
   encrypting memory pages;
   storing the encrypted memory pages in a file system of the data processing system;
   generating hashes of the encrypted memory pages;
   providing the hashes to the hypervisor;
   using, by the hypervisor, the hashes to determine if a memory page being accessed in the system memory is classified as being in the secure enclave or in the unsecure memory area;
   decrypting a register file of the data processing system in response to a processor of the data processing system executing code inside the secure enclave, the register file being used by the processor for temporary storage of data and addresses used in the executing of the code; and
   encrypting the register file in response to the processor executing code outside the secure enclave.

2. The method of claim 1, further comprising:
   initially granting SLAT access rights to all the plurality of memory pages; and
   generating, by the hypervisor, an exception when an initial access to a memory page is attempted,
   wherein using the hashes further comprises checking, by the hypervisor, the hash of the memory page being initially checked to determine if the memory page belongs in the secure enclave or in the unsecure memory area.

3. The method of claim 1, further comprising determining if a memory access crosses a boundary between the secure enclave and the unsecure memory area, wherein on determining that the memory access crosses the boundary, the hypervisor removes execute, read, and write access rights to the plurality of memory pages.

4. The method of claim 1, wherein on an initial read or write access to a memory page of the plurality of memory pages, determining if the read or write access is allowed, wherein if the read or write access is allowed and the accessed memory page is encrypted, the accessed memory page is decrypted, wherein if the read or write access to the memory page is not allowed and the accessed memory page is not encrypted, the accessed memory page is encrypted, and wherein if the read or write access to the memory page is not allowed, and the accessed memory page is encrypted, the accessed memory page remains encrypted and the read or write access is granted.

5. The method of claim 1, wherein the register file is also used for storage of program counter values.

6. The method of claim 5, wherein when the processor executes code inside the secure enclave, the processor switches to an enclave program stack having a stack pointer, and when the processor exits the secure enclave, the processor resets the stack pointer of the enclave program stack to what the stack was before the processor executed the code inside the secure enclave.

7. The method of claim 1, further comprising:
   accessing a code memory page, the code memory page storing executable code;
   determining that the code memory page is in the unsecure memory area;
   determining that a boundary of the secure enclave is being crossed and the code memory page is outside the secure enclave;
   encrypting the code memory page; and
   granting access rights to the accessed code memory page.

8. The method of claim 1, wherein the plurality of memory pages is in a virtual memory area of the data processing system.

9. The method of claim 1, further comprising:
   accessing a data memory page, the data memory page for storing data;
   determining that the data memory page being accessed is in the secure enclave;
   determining that the access to the data memory page is not allowed;
   determining that the data memory page is not encrypted;
   encrypting the data memory page; and
   granting access to the data memory page.

10. A method for accessing a memory page in a system memory of a data processing system, the data processing system having a guest operating system (OS) providing first level address translation (FLAT) and a hypervisor providing second level address translation (SLAT), the hypervisor controlling access rights to each of a plurality of memory pages of the system memory, wherein the plurality of memory pages comprises code memory pages for storing program code to be executed by a processor of the data processing system and data memory pages for storing data that is not program code, the method comprising:
   determining which memory pages of the plurality of memory pages are to be stored in the secure enclave;
   encrypting the memory pages;
   storing the encrypted memory pages in a file system of the data processing system;
   generating hashes of the encrypted memory pages;
   providing the hashes to the hypervisor;
   using, by the hypervisor, the hashes to determine if a memory page being accessed in the system memory is classified as in the secure enclave or in the unsecure memory area;
   accessing a code memory page;
   determining that the access crosses a boundary of the secure enclave;
   determining that the access is from outside the secure enclave;
   encrypting the code memory page;
   granting access to the code memory page;
   decrypting a register file of the data processing system in response to a processor of the data processing system executing code inside the secure enclave, the register file being used by the processor for temporary storage of data and addresses used in the executing of the code; and
   encrypting the register file in response to the processor executing code outside the secure enclave.

11. The method of claim 10 further comprising:
   accessing a data memory page;
   determining that the data memory page being accessed is classified as in the secure enclave;

determining that the access to the data memory page is allowed;
determining that the data memory page is not encrypted;
encrypting the data memory page; and
granting read or write access to the data memory page.

12. The method of claim 10, further comprising:
initially granting SLAT access rights to all the plurality of memory pages; and
generating, by the hypervisor, an exception when an initial access to a memory page is attempted.

13. The method of claim 10, wherein determining that the access crosses a boundary of the secure enclave further comprises removing execute, read, and write access rights to the plurality of memory pages.

14. The method of claim 10, wherein the register file is also used for storage of program counter values.

15. The method of claim 14, wherein when the processor executes code inside the secure enclave, the processor switches to an enclave program stack having a stack pointer, and when the processor exits the secure enclave, the processor resets the stack pointer of the enclave program stack to what the stack was before the processor executed the code inside the secure enclave.

16. A data processing system comprising:
a processor for executing instructions under the control of a guest operating system (OS);
a system memory coupled to the processor, the system memory configured to store a plurality of memory pages, wherein a first portion of the plurality of memory pages are stored in an unsecure memory area of the system memory and a second portion of the plurality of memory pages are stored in a secure enclave, wherein the secure enclave is more secure than the unsecure memory area, and wherein the second portion of the plurality of memory pages is stored encrypted in the secure enclave, and wherein a hash is generated of each of the second portion of the plurality of memory pages;
a hypervisor coupled to the system memory, wherein the guest OS provides first level address translation (FLAT) and the hypervisor provides second level address translation (SLAT), wherein the hypervisor controls SLAT read, write, and execute access rights of the plurality of memory pages, and wherein the hypervisor determines if an accessed memory page of the plurality of memory pages is classified as being in the secure enclave based on the hash; and
a register file coupled to the processor to be used for temporary storage of data and addresses used by the processor in executing the instructions, the register file decrypted in response to the processor executing the instructions inside the secure enclave, and the register file encrypted in response to the processor executing the instructions outside the secure enclave.

17. The data processing system of claim 16, wherein the register file also used for storage of program counter values.

18. The data processing system of claim 16, wherein the second portion of the plurality of memory pages stored in the secure enclave includes code memory pages for storing program code executed by the processor and data memory pages for storing data that is not program code.

19. The data processing system of claim 18, wherein the hypervisor grants read or write access to a data memory page in the secure enclave when the read of write access is not allowed after encrypting the data memory page.

20. The data processing system of claim 16, wherein the hypervisor generates an exception in response an initial access attempt to a memory page in the secure enclave.

* * * * *